United States Patent

[11] 3,590,364

| | | |
|---|---|---|
| [72] | Inventor | Neil I. Okun |
| | | Woodland Hills, Calif. |
| [21] | Appl. No. | 885,433 |
| [22] | Filed | Dec. 16, 1969 |
| [45] | Patented | June 29, 1971 |
| [73] | Assignee | Litton Systems, Inc. |
| | | Beverly Hills, Calif. |

[54] CURRENT LIMITING POWER SUPPLY
6 Claims, 1 Drawing Fig.

[52] U.S. Cl. .................................................. 323/9,
323/17, 323/22 T
[51] Int. Cl. .................................................. G05f 1/56
[50] Field of Search .................................................. 323/4, 9,
17, 22 T, 16—22; 321/16, 18

[56] References Cited
UNITED STATES PATENTS

| | | | |
|---|---|---|---|
| 3,264,550 | 8/1966 | Paice ............................ | 323/9 |
| 3,328,674 | 6/1967 | Bleicher ....................... | 323/22 (T) |
| 3,365,650 | 1/1968 | Camp et al. ................... | 321/18 |
| 3,396,326 | 8/1968 | Kisrow ......................... | 323/17 X |
| 3,417,321 | 12/1968 | Clapp .......................... | 323/22 (T) |
| 3,510,755 | 5/1970 | Gerard et al. ................. | 323/22 (T) |
| 3,514,692 | 5/1970 | Lingle .......................... | 323/22 (T) |

*Primary Examiner*—Gerald Goldberg
*Attorneys*—Alan C. Rose, Alfred B. Levine, Ronald W. Reagin, Lawrence V. Link, Jr. and Thomas A. Seeman ABSTRACT: A power supply for regulating an input source voltage to provide a DC output current of a predetermined maximum level and a DC output voltage of a predetermined level including a transistor switch, a transformer and a filter connected in series between input and output terminals. Current flows through the primary winding of the transformer thereby inducing a voltage on a secondary winding proportional to the output current level of the power supply. The proportional voltage actuates a first bistable device to a first or second stable state to generate a control signal depending upon the output current being above or below a predetermined maximum level. Voltage regulation is accomplished by comparing variations in the output voltage with a reference voltage to produce an error signal, the error signal actuating a second bistable device to a first and second stable state depending upon the output voltage level being above or below the predetermined level, the second bistable device controlling the transistor switch conductivity or nonconductivity to maintain the predetermined voltage. Current limiting is accomplished by utilizing the first bistable device to control the second bistable device which in turn controls the conductivity of the transistor switch to maintain the output current level below the predetermined maximum level.

PATENTED JUN 29 1971
3,590,364
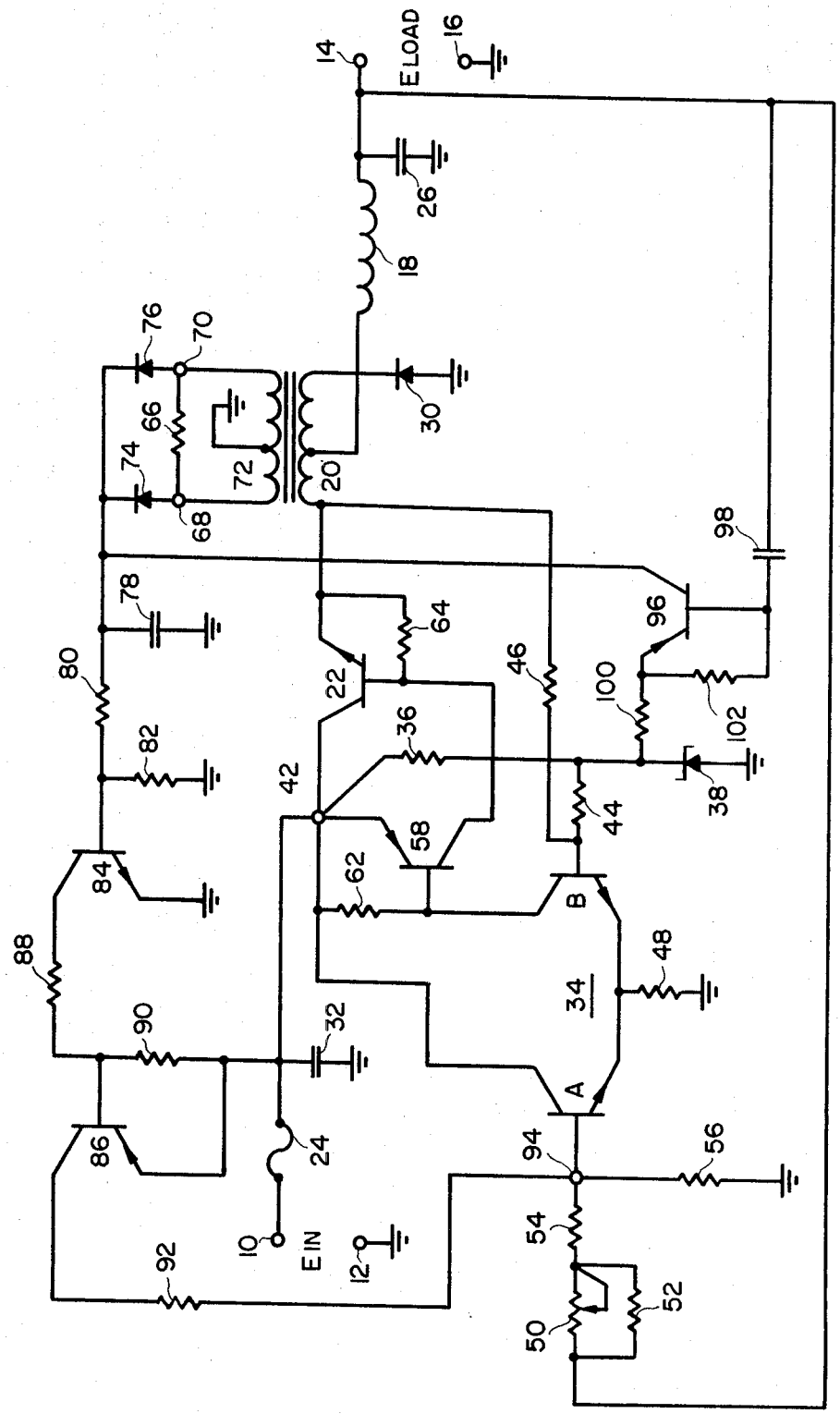
INVENTOR.
NEIL I. OKUN
BY
ATTORNEY

CURRENT LIMITING POWER SUPPLY

BACKGROUND OF THE INVENTION

In the prior art, current limiting has been accomplished in series switching power supplies by utilizing a sensing resistor connected in series between a switching transistor and an output filter. One undesirable characteristic of such power supplies has been the loss of power which occurs because of the flow of the entire load current through the series sensing resistor. In order to minimize this loss of power, it has been usual to select a sensing resistor having an extremely low value of resistance. While the power loss decreases linearly as the value of the resistor decreases, so does the voltage drop across the sensing resistor. A smaller voltage drop across a sensing resistor requires more amplification to control current through a switching transistor. In order to control current through a switching transistor with a voltage in the order of a few 10 ths of a volt, it is necessary to utilize circuitry for amplifying the voltage. Additional circuitry for this purpose increases the cost of a current limiting power supply of this type.

SUMMARY OF THE INVENTION

The present invention overcomes the above and other disadvantages of current limiting series regulators of the prior art by providing a current transformer connected in series between a switching transistor and a smoothing filter which, according to the basic concept of the invention, operates at a higher efficiency because the sensing transformer consumes less power than does a series sensing resistor of the prior art. In addition, because of the inherent properties of the transformer, it is possible to induce a stepped-up voltage in the secondary of the transformer. Therefore, the voltage induced on the secondary winding of the sensing transformer will be substantially higher than the voltage drop across a sensing resistor. A signal from a sensing transformer requires less amplification to control conductivity of the series switching transistor than would a signal developed across a sensing resistor. Correspondingly less circuitry is required to amplify this signal in order to control the switching transistor.

More specifically, the current limiting power supplies of the invention employ a sensing transformer which is coupled between a switching transistor and a flyback diode, the primary of the sensing transformer having a center tap connected to a smoothing inductance and which is operative to induce a voltage on the secondary of the transformer which is proportional to the magnitude of the current flowing through the primary of the transformer. During the period that the transistor switch is in conduction, the primary of the transformer is energized by a first current path through the switch, a part of the primary winding, and through the smoothing inductance. This current flow induces a voltage on the secondary winding of the transformer of one polarity. During the period of nonconductivity in the transistor switch a second current path exists through the smoothing inductance, the other part of the primary winding of the sensing transformer and through the flyback diode connected to the other end of the transformer. The current is supplied by the collapsing filed of the smoothing inductance. The current through the second path flows through the transformer in the opposite directing from that during the first half of the cycle. This induces a voltage on the secondary of the transformer which is of opposite polarity from the voltage induced during the first half of the cycle. Thus, an AC voltage which is proportional to current flow through the transistor switch and through the load is induced in the secondary winding of a sensing transformer.

The voltage induced on the secondary winding of the sensing transformer is rectified, then coupled to a first bistable device which is responsive to this induced voltage for switching to a first stable state whenever the output current rises above a predetermined maximum level and to a second stable state whenever the output current falls below this level. The output of the bistable device controls conductivity in the transistor switch. When the maximum current level is exceeded, the bistable device gates the transistor switch out of conduction. Conversely, during periods of normal operation when the output current level is below the predetermined maximum, the bistable device will not affect the transistor switch.

A transistor amplifier triggering circuit is utilized to sense instantaneously overloads with might be caused, for example, by a short circuit in load. The output voltage is coupled to the input of the transistor amplifier. In the event of an instantaneous overload, a trigger is developed by the amplifier and is coupled to the first bistable device which, in turn, gates the transistor switch of of conduction.

In the preferred embodiment of the invention voltage regulation is accomplished by sensing variations in the output voltage level, comparing these variations with a reference voltage in a second bistable device such as a difference amplifier. Variations in the output voltage level above the below a predetermined output level cause a corresponding change of the stable state in the second bistable device. The output of the second bistable device is used to control the state of conductivity in the transistor switch. As the output voltage rises above the predetermined level, the second bistable device gates the transistor switch out of conduction. Conversely, as the output voltage falls below the predetermined level, the second bistable device gates the transitor switch onto conduction. In the preferred embodiment both current and voltage regulation are accomplished by coupling the output of the first bistable device which indicates either a normal or an overcurrent condition to the input of the sensing bistable device in addition to the voltage sensing input. Thus, the second bistable device will control conductivity through the transistor switch due to either a voltage or a current condition.

It is therefore an object of the invention to provide a power supply for limiting a DC current to a predetermined maximum level.

Another object of the invention is to provide a power supply for a transforming an unregulated voltage into a regulated voltage of predetermined magnitude.

A further object of the invention is to provide a regulated power supply which filters a variable width pulse train from a commutated series switch to provide an output voltage equal to the average value of the pulse train.

Still another object of the invention is to provide a regulated power supply capable of maintaining a substantially constant output voltage with minimum internal power dissipation.

DESCRIPTION OF THE DRAWINGS

The novel features which are believed to be characteristic of the invention, both as to its organization and method of operation, together with further objects and advantages thereof, will be better understood from the following description considered in connection with the accompanying drawing in which the preferred embodiment of the invention is illustrated by way of example. It is to be expressly understood, however, that the drawing is for the purpose of illustration and description only, and is not intended as a definition of the limits of the invention.

The drawing is a schematic diagram of the preferred embodiment of the invention.

DESCRIPTION OF THE PREFERRED EMBODIMENT

With reference now to the drawing there is shown a schematic diagram of the regulating power supply of the present invention. An unregulated DC voltage source (not shown) is connected to a pair of signal input terminals 10 and 12 so that a positive voltage appears at terminal 10. The regulated output voltage is supplied to output terminals 14 and 16 so that positive potential appears at terminal 14. Of course, the design of the regulator may be altered to produce a negative voltage at terminal 14. The load (not shown) is connnected to the pair of output terminals 14 and 16. A current path is completed by connecting output terminal 16 to input terminal 12 and by connecting inductance 18, a part of the primary winding of sensing transformer 20, a transistor switch 22 and a fuse 24 in series between output terminal 14 and input terminal 10.

Consider now the manner in which a constant output voltage is conventionally produced. The unregulated DC voltage appearing at input terminal 10 is converted to pulses of varying width by transistor switch 22, a filter comprising inductance 18 and a capacitor 26 and a diode 30 operates to smooth the pulse train received from transistor switch 22. Transistor switch 22 is gated in and out of conduction in response to variations in the output voltage appearing at terminal 14 as hereinafter described.

The output from the switch, a pulsating DC voltage, is applied to inductance 18 through a part of the primary winding of transformer 20. The operation of sensing transformer 20 is considered below in the discussion pertaining to current limiting. Diode 30 is connected between one end of the primary winding at transformer 20 and terminal 16. Capacitor 26 is connected between terminals 14 and 16. During the interval the transistor 22 is conducting, the positive potential appearing at its emitter is applied to inductance 18. During this period of conduction inductance 18 and capacitor 26 stored energy, the inductance in the form of a magnetic field and the capacitor in its static charge. After transistor 22 ceases to conduct, the collapsing magnetic field of inductance 18 and, possibly, the charge of capacitor 26 supply energy to maintain a constant flow of current through the load (not shown). Diode 30 completes a conduction path for the load current during the period when transistor 22 is nonconducting. Capacitor 32 is a filter capacitor connected between the collector of transistor 22 and ground (terminal 12) to eliminate noise superimposed on the input voltage. Fuse 24 is connected between input terminal 10 and the collector of transistor 22. Fuse 24 blows only in the event of a failure internal to the power supply and not upon the occurrence of a current overload on the load circuit.

Difference amplifier 34 develops output pulses having a width proportional to deviations in the output voltage from a desired level. A reference potential, which is independent of variations in the output voltage is supplied to the base of difference amplifier 34B by a reference voltage network comprising resistor 36, Zener diode 38 and resistor 44. The unregulated input voltage at terminal 10 is supplied to the network by connecting resistor 36 to terminal 42. Zener diode 38 is connected between resistor 36 and ground (terminals 12 and 16). The voltage across resistor 36 fluctuates with variations in the input voltage. The characteristics of the Zener diode provide a constant, predetermined voltage drop across the diode. The voltage at the junction of resistor 36 and Zener diode 38 is a reference voltage applied to the base of difference amplifier 34B through resistor 44. A resistor 46 is connected between the output of transistor 22 to the input of difference amplifier 34B. The function of resistor 46 is discussed below in the detailed description of difference amplifier 34. A resistor 48 is connected to both the emitters of difference amplifier 34 and ground which is connected to output terminals 12 and 16. The amount of collector current in difference amplifier 34 is a function of the resistance of resistor 48. Resistor 48 forms a current source for differential amplifier 34.

A signal responsive to variations in the output voltage at terminal 14 is applied to the base of difference amplifier 34A through a voltage divider network comprising resistors 50, 52, 54 and 56. Resistors 50, 52, 54 and 56 divide the output voltage to equal the reference voltage. The values of resistors 50, 52, 54 and 56 are chosen to provide a zero difference in potential between the bases of difference amplifier 34 for a predetermined output voltage level. The predetermined output voltage level may be selected from a range of voltages by adjusting variable resistor 50. An error signal having a width proportional to the difference between the output voltage and the predetermined voltage appears at the collector of difference amplifier 34B.

The output signal from the collector of difference amplifier 34B is applied to the base of a transistor 58. A resistor 62 is connected between the input voltage at terminal 42 and the junction of the base of transistor 58 and the collector of difference amplifier 34B. Transistor 58 functions as a switch. It is normally biased out of conduction because its base is tied to its emitter through resistor 62. Resistor 62 also functions to decrease the switching time when transistor 58 is gated out of conduction by decreasing storage time in the transistor. The signal appearing at the collector transistor 58 consists of a series of pulses each proportional in width to the difference between the output voltage and a predetermined voltage.

The signal appearing at the collector of transistor 58 is applied to the base connection of transistor switch 22 to drive the switch in and out of conduction as a function of the fluctuations in the output voltage of the regulator. Each time that the signal applied at the base of transistor 22 drives it into conduction, the potential at the emitter of transistor 22 approaches the positive potential at input terminal 10. Likewise, when the input signal to transistor 22 drives the switch out of conduction, the potential at the emitter of the switch falls to approximately 0 to −1 volts. A resistor 64 is connected between the base and emitter of transistor 22 to decrease the switching time when the transistor is gated out of conduction.

Turning now to a consideration of current limiting circuitry, the primary winding of current sensing transformer 20 is connected between the emitter connection of transistor 22 and diode 30. The center tap of transformer 20 is connected to inductance 18. During the period of conduction by transistor 22, the primary of transformer 20 is energized by current flowing through transistor 22, a portion of the primary winding of transformer 20 and inductance 18. During the period that transistor 22 is out of conduction, current flows through diode 30, through the other portion of the primary winding, of transformer 20 and through inductance 18. A voltage proportional to the load current is induced on the secondary winding to transformer 20. A resistor 66 is connected in parallel with the secondary winding of transformer 20 at terminals 68 and 70. The center tap of the secondary winding of transformer 20 is grounded at terminal 72. Current flow through resistor 66 develops a peak-to-peak voltage drop across resistor 66 that is proportional to the load or output current. This voltage is then rectified by diodes 74 and 76 and is peak-detected by a capacitor 78. Peak-detection produces a DC peak voltage charge on the capacitor 78 that discharges from the peak voltage appearing across the resistor 66 at a time constant determined by resistors 80 and 82. Resistors 80 and 82 comprise a voltage divider network which divides the peak-detected voltage to which capacitor 78 is charged. The voltage at the junction of resistors 80 and 82 is applied to the base of transistor 84 to control conduction in it. the output voltage at the collector of transistor 84 is applied to the base of transistor 86 through resistor 88. A resistor 90 is connected between the emitter and the base of transistor 86 to decrease the switching time when transistor 86 is gated out of conduction.

The amount of load current is limited by utilizing the signal at the collector of transistor 86 which is a function of the load current, to control conduction through transistor 22. The output signal from transistor 86 is applied through a resistor 92 to the summing point, terminal 94, which is the input to the base of difference amplifier 34A.

Transistor 96 and capacitor 98 are utilized to improve the response time of the current limiting circuitry in the event of an instantaneous overcurrent condition. Without the addition of transistor 96 the response time of the current limiting circuit is limited by the time necessary to charge capacitor 78. Capacitor 98 is connected to output terminal 14 to couple a negative voltage to the base of transistor 96 in the event the output voltage 96 is connected to capacitor 78. A resistor 100 is connected between the emitter of transistor 96 and the junction of Zener diode 38 and resistor 36. Resistor 100 limits peak current through transistor 96. A resistor 102 is a bias resistor connected between the emitter and base of transistor 96.

Consider now the manner in which regulation of the output voltage is achieved. A stepdown DC-to-DC voltage conversion id accomplished by rapidly opening and closing transistor 22 which is connected to the source voltage at terminal 10. The output of transistor 22 is a pulsating DC voltage that is nearly equal to the source voltage when the switch is conducting and approximately zero when the switch is nonconcucting. The average value of the output voltage of transistor 22 is proportional to the input voltage and to the ratio of the conducting time of transistor 22 to the total operating time. The use of diode 30 which shunts transistor switch 22, in combination with series inductance 18, provides a path for the load current when transistor 22 is nonconducting. This permits continuous current flow through the load (not shown) and produces the average value of the output voltage from the switch. The output voltage to the load appearing at terminal 14 is maintained at a predetermined level by actuating transistor 22 in response to a signal which is a measure of the deviation of the output voltage from the predetermined level. This signal is produced by comparing the output voltage with the reference voltage in difference amplifier 34. If the output voltage drops below the desired volume transistor 22 will be gated on; and, likewise, if the output voltage rises above the desired value, transistor 22 will be gated out of conduction. As a result, the average value of the output voltage at output terminal 14 remains very nearly constant. The switching action cannot occur at the instant the output voltage deviates above or below the desired value because of the delay inherent in the actuating circuitry and in the switch itself. The time delay in the switching action results in a slight overshoot or undershoot of the output voltage of the output voltage. Thus, the output voltage varies in a small band about the desired level. This principal of actuation of the switch is known as pulse-width modulation. The average load voltage ($E$-load) over a repetitive time interval is related to the source voltage ($E_{in}$) as follows:

$$E_{load} = E_{in} \cdot \frac{T_{on}}{T_{on} + T_{off}}$$

where $T_{on}$ is total conduction time of the switch and $T_{off}$ is the total nonconducting time of the switch during the repetitive time interval.

Current flow during the periods that transistor 22 is nonconducting is supplied by inductance 18, capacitor 26 and diode 30. Assume for purposes of considering the voltage regulation that inductance 18 and diode 30 are both directly connected to the emitter of transistor 22. The operation of transformer 20 is considered below in the discussion pertaining to the operation of the circuit limiting circuitry. During the portion of each cycle that transistor 22 is conducting, current flow through inductance 18 creates a magnetic field and also charges capacitor 26. During the portion of the cycle that transistor 22 is not conducting, the collapsing magnetic filed of inductance 18 supplies current flow to the load. In normal operation transistor 22 will be gated back into conduction before the magnetic field of inductance 18 has entirely collapsed. If the field does collapse entirely, capacitor 26 would discharge to maintain the load current constant for a time. Inductance 18 and capacitor 26 operate as a filter which integrates the DC pulses from transistor 22 to produce an average DC output voltage. Because the average voltage across inductance 18 is zero, the voltage drop across inductance 18 is not a factor in the expression for the average output voltage at terminal 14. Diode 26 must be connected with the proper polarity to permit current flow during the period that transistor 22 is nonconducting. Thus, there is available at terminal 14 a substantially constant output voltage with a magnitude dependent upon the level of the source voltage and the duty cycle of transistor 22.

Turning now to an explanation of the manner in which difference amplifier 34 compares the output voltage at terminal 14 with a predetermined voltage to control the periods of conduction and nonconduction through transistor 22. Assume that the input voltage at terminal 10 fluctuates in a more positive direction. The average value of the output voltage at terminal 14 increases in accordance with the formula stated above. Resistors 50, 52 and 54 sense this increase in the output voltage thereby causing the voltage at the summing point input to difference amplifier 34A, terminal 94, to be positive with respect to the predetermined reference voltage at the base of difference amplifier 34B. This positive differential between the bases causes amplifier 34A to conduct which, in turn, causes amplifier 34B to cease conduction. As amplifier 34B ceases to conduct, a positive-going voltage appears at its collector which is coupled to transistor 58 to drive it out of conduction. A negative-going voltage appears at the collector of transistor 58. This negative-going voltage is applied to the base of transistor switch 22 to drive switch 22 out of conduction. After switch 22 is driven out of conduction, the field of inductance 18 starts to collapse. The average value of the output voltage at terminal 14 falls below the predetermined level. Again, resistors 50, 52 and 54 sense this variation causing the summing point terminal 94 to be negative with respect to the base of difference amplifier 34B. This negative potential difference causes difference amplifier 34A to cease conduction and difference amplifier 34B to commence conduction. The width of the pulse output from difference amplifier 34B during its period of nonconduction is proportional to the deviation of the output voltage above the predetermined voltage. The negative-going voltage appearing at the collector of difference amplifier 34B as it begins to conduit is coupled to transistor 58 to gate it into conduction. As transistor 58 begins to conduct, a positive-going voltage appears at its collector. This voltage is coupled to the base of transistor 22 to gate it into conduction. Transistor 22 will continue to conduct until the average value of the output voltage at terminal 14 rises above the predetermined voltage. When such a deviation occurs again, conduction in difference amplifier 34B will again be reversed thus completing the cycle. The output pulse form 34B during its period of conduction is proportional in width to the deviation of the output voltage below the predetermined voltage. The foregoing cycle repeats itself in accordance with variations in the output voltage from the predetermined voltage.

The detailed operation of difference amplifier 34 is described as follows. A reference voltage of predetermined amplitude is developed by dividing the input voltage appearing at terminal 42 across resistor 36 and Zener diode 38. The breakdown characteristics of the Zener diode are such that the voltage across it is constant and independent of the variations in the input voltage. A voltage which fluctuates in proportion to the output voltage at terminal 14 appears at terminal 94, the summing point input to difference amplifier 34. A resistor 48 is common to both emitters of difference amplifier 34 and therefore acts as a constant current source for the emitters. A positive signal at one base with respect to the other will cause all of the current flow from resistor 48 to flow through one side of the difference amplifier thereby cutting the other side of conduction. Thus difference amplifier 34 operates as a bistable device. Difference amplifier 34 gates transistor 22 out of conduction when the output voltage rises slightly above a predetermined level and into conduction when the output voltage falls slightly below the predetermined level. This is accomplished by unbalancing the operation of difference amplifier 34. Resistor 46 couples the waveform of the output pulses from transistor 22 to the base input of difference amplifier 34B. In effect, the reference voltage applied to the base of amplifier 34B has superimposed on it output pulses form transistor 22 which are greatly reduced in amplitude. The superimposed, miniature pulses appear only during the period transistor 22 is in conduction. The reference voltage applied to difference amplifier 34B varies between two slightly different levels depending whether transistor 22 is in or out of conduction. Correspondingly, the voltage input to difference amplifier 34A necessary to reverse the state of conduction varies slightly also depending on whether switch 16 is in or out of conduction. As a result, transistor 22 will stay in conduction until the output voltage rises slightly above a predetermined voltage level at which time the voltage at the summing point 94 becomes more positive than the reference voltage plus the superimposed pulse applied to the base of difference amplifier 34B. At this point transistor 22 will be gated out of conduction in the manner discussed above and will remain out of conduction until the voltage at summing point 94 falls below the reference voltage input to the base of difference amplifier 34B. Since the superimposed pulse is not present when transistor 22 is out of conduction, the output voltage will fall slightly below a predetermined level before transistor 22 is gated back into conduction. Thus, the output voltage varies in a small predetermined range of amplitude about a predetermined level.

Referring now to the operation of the novel current limiting circuitry of the invention. Transformers are well known AC devices which require a changing current in a primary winding to induce a current in a secondary winding. According to the invention, an AC transformer is utilized in a DC circuit to provide an indication of the DC output current in the following manner. During the period that transistor 22 is conducting, current flows through part of the primary winding to transformer 20 from the center tap to the emitter of transistor 22. This induces a voltage on the secondary winding of one polarity. During the second part of a cycle when transistor 22 is nonconducting, DC current flows through diode 30 and inductance 18 as described above. In addition, part of the winding of transformer 20 is connected between diode 30 and inductance 18. Note that diode 30 and inductance 18 are connected to the primary of transformer 20 so that current during the second portion of the cycle flows through the primary winding of transformer 20 in the opposite direction from the current flowing during the first portion of the cycle. This induces a voltage in the secondary winding of transformer 18 which has an opposite polarity from the voltage induced during the first portion of the cycle. Thus, an AC voltage which is proportional to current flow through the load (not shown) is induced in the secondary winding of transformer 20.

The current in the secondary winding of transformer 20 which is proportional to the load current, is used to modulate the duty cycle of transistor 22. A voltage which is proportional to the load current is developed across resistor 66. A signal indicative of an overcurrent is developed from the voltage across resistor 66 and is applied to the summing point, terminal 94, which is the input to the base of difference amplifier 34A. This signal from the current limiting circuitry controls the conduction and nonconduction of difference amplifier 34, transistor 58 and transistor 22 in the same manner as described above. For example, an overcurrent condition will result in a positive-going voltage at the base of difference amplifier 34A which will in turn gate transistor 22 out of conduction.

The voltage appearing across resistor 66 is proportional to the load current and is used to control the state of conduction of transistor 84. This voltage is first rectified by diodes 74 and 76 and is then peak-detected by capacitor 78. The peak-detected voltage charging capacitor 78 is scaled down by the voltage divider network comprising resistors 80 and 82. The voltage appearing at the junctions of resistors 80 and 82 gates transistor 84, which operates as a bistable device in and out of conduction. During a period of normal load conditions the voltage at the base of transistor 84 biases it out of conduction. In the event of an overcurrent conduction the resulting voltage at the base of transistor 84 causes it to conduct. The state of conduction in transistor 84 is repeated in transistor 86. As transistor 84 starts to conduct, a negative-going voltage is applied to resistor 88 to the base of transistor 86. This negative-going voltage drives transistor 86 into conduction. Note in the schematic diagram that the transistor shown as transistor 86 is a PNP type and transistor 84 is a NPN type. Opposite types of transistors are utilized in order to obtain a positive-going voltage at the collector of transistor 86 when amplifier 90 is driven into conduction. This positive-going voltage is applied through resistor 92 to the summing point, terminal 94, which is the input to difference amplifier 34A.

A positive-going voltage at the summing point, terminal 94, caused by an overcurrent condition, will gate transistor 22 out of conduction until the load current decreases below a normal predetermined value. During the period that transistor 22 is nonconducting, the load current is supplied by the collapsing magnetic field in inductance 18 and, if the magnetic filed completely collapses, by the charge in capacitor 26. The decreasing load current induces a smaller voltage in the secondary winding of transformer 20. As the load current continues to decrease so does the voltage to which capacitor 78 is charged. Recall that the charge on capacitor 78 leaks to ground as a function of the time constant of capacitor 78 and resistors 80 an 82. As capacitor 78 discharges, the voltage at the base of transistor 84 falls below the cutoff point thereby biasing it out of conduction. When transistor 84 is biased out of conduction, a positive-going waveform at its collector 88 is coupled to the base of transistor 86. Transistor 86 is thereby biased out of conduction which, in turn, produces a negative going waveform at the base of difference amplifier 34A. A negative-voltage at the base of difference amplifier 34A with respect to the base of difference amplifier 34B gates transistor 22 into conduction in the manner discussed above thereby completing a current limiting cycle of operation.

Transistor 96 gates transistor 22 out of conduction in the event of an instantaneous short circuit in the load (not shown). For example, a shunt of the output voltage at terminal 14 to ground (terminal 16) would result in a heavy overcurrent condition. Capacitor 78 has a relatively slow time constant. Almost instantaneous current limiting is achieved by coupling a negative-going voltage from capacitor 98 to the base of transistor 96. This negative-going voltage gates transistor 96 into conduction thereby producing a positive-going voltage at its collector. The positive-going voltage is applied to capacitor 78 an causes transistor 84 to conduct and stay in conduction until the voltage across transistor 66 has charged capacitor 78 to the value which will hold transistor 84 in conduction for the duration of the overcurrent condition. Once transistor 96 gates transistor 84 into conduction, the operation of the current limiting circuitry is identical to that discussed above.

It is to be understood that the above described arrangements are illustrative of the application of the principals of the invention. Numerous other arrangements may be devised by those skilled in the art without departing from the spirit and scope of the invention. Thus, by way of example and not of limitation, the voltage regulation circuitry need not be the difference amplifier, the voltage sensing network and the reference voltage network as shown. Other known techniques may be employed in the regulation of the output voltage. Accordingly, from the foregoing remarks, it is understood that the present invention is to be limited only by the spirit and scope of the appended claims.

What I claim is:

1. A power supply for regulating a current to provide current of a predetermined maximum level comprising:
   a pair of output terminals for connecting a load;
   a pair of input terminals for receiving a source current, a first one of said pair of input terminals electrically connected to a first one of said pair of output terminals;
   switch means connected to a second one of said pair of input terminals, said switch means selectively actuable for establishing either a conductive or a nonconductive connection through said switch to said input terminal;
   a filter network connected to said pair of output terminals for smoothing DC pulses to a continuous current flow;
   a diode connected to said first output terminal;
   a transformer having a center-tapped primary winding and a secondary winding, said primary winding connected between said switch means and said diode, said center-tap connected to said filter network, said primary winding inducing a voltage in said secondary winding proportional to the flow of current in said primary winding; and a bistable device coupled to said secondary winding of said transformer and responsive to the output voltage thereon for switching to a first stable state whenever the output current rises above a predetermined level and for switching to a second stable state whenever the output current falls below a predetermined level, said bistable device actuating said switch means to establish a conductive connection whenever it switches to one of its stable states and said bistable device actuating said switch means to establish a nonconductive connection whenever it switches to the other of its stable states.

2. A combination as defined in claim 1 wherein said filter network for smoothing DC pulses includes an inductance connected at one end to said second output terminal and a capacitance connected between said pair of output terminals, said center tap of said transformer being connected to the other end of said inductance.

3. The combination as defined in claim 1 wherein said filter network includes an inductance connected at one end to said second output terminal and a capacitance connected between the other end of said inductance and said first output terminal, said center tap of said transformer being connected to the junction of said inductance and said capacitance.

4. The combination as defined in claim 1 and further comprising an amplifier connected between said second output terminal and said bistable device and responsive to the output current for switching said bistable device from one of its stable states to the other when an instantaneous overload occurs in the output current.

5. A power supply for regulating a current and voltage to provide a DC output current of predetermined maximum level and a DC output voltage of predetermined voltage level comprising:

a pair of output terminals for supplying an output voltage and current to a load;

a pair of input terminals for receiving a source voltage and current, a first one of said pair of input terminals electrically connected to a first one of said pair of output terminals;

switch means connected to a second one of said pair of input terminals, said switch means selectively actuatable for establishing either a conductive or a nonconductive connection through said switch in said second input terminal;

a filter network connected to said pair of output terminals for smoothing unidirectional voltage pulses, into a substantially constant output voltage, said filter network comprising an inductance connected to said second output terminal and a capacitor connected to said inductance and to said first output terminal;

a diode connected to said first output terminal;

a transformer having a center-tapped primary winding and a secondary winding, said primary winding connected between said switch means and said diode, said center tap connected to said inductance, said primary winding inducing a voltage in said secondary winding proportional to the flow of current in said primary winding;

means for producing a reference voltage;

a first bistable device coupled to receive the reference voltage and the output voltage for producing a first error signal whenever the output voltage falls below the reference voltage and for producing a second error signal whenever the output voltage rises above the reference voltage;

means responsive to the first error signal for actuating said switch means to establish a conductive connection ad responsive to the second error signal for actuating said switch means to establish a nonconductive connection;

rectifying means coupled to the secondary winding of said transformer responsive to the induced voltage thereon for producing a DC voltage proportional to the flow of current in the primary winding of said transformer;

a second bistable device coupled to said rectifying means for switching to a first stable state whenever the output current rises above a predetermined level and for switching to a second stable state whenever the output current falls below a predetermined level, said second bistable device connected to said first bistable device for actuating said first bistable device to produce said first error signal whenever the output current falls below said predetermined level and for producing said second error signal whenever the output current rises above said predetermined level.

6. The combination as defined in claim 5 and further comprising:

an amplifier connected between said second output terminal and said second bistable device for switching said second bistable device from one of the stable states to the other whenever on instantaneous overload occurs in the output current.